United States Patent
Delhomme-Neudecker et al.

(10) Patent No.: US 11,105,007 B2
(45) Date of Patent: Aug. 31, 2021

(54) METHOD FOR THE ELECTROCHEMICAL PRODUCTION OF A GAS PRODUCT CONTAINING CO

(71) Applicants: Siemens Aktiengesellschaft, Munich (DE); Linde GMBH, Pullach (DE)

(72) Inventors: Clara Delhomme-Neudecker, Munich (DE); Marc Hanebuth, Nuremberg (DE); Andreas Peschel, Wolfratshausen (DE); Günter Schmid, Hemhofen (DE); Nicole Schödel, Munich (DE); Dan Taroata, Erlangen (DE)

(73) Assignees: Siemens Aktiengesellschaft, Munich (DE); Linde GMBH, Pullach (DE)

( * ) Notice: Subject to any disclaimer, the term of this patent is extended or adjusted under 35 U.S.C. 154(b) by 0 days.

(21) Appl. No.: 16/964,763

(22) PCT Filed: Jan. 18, 2019

(86) PCT No.: PCT/EP2019/051257
§ 371 (c)(1),
(2) Date: Jul. 24, 2020

(87) PCT Pub. No.: WO2019/158308
PCT Pub. Date: Aug. 22, 2019

(65) Prior Publication Data
US 2021/0010142 A1     Jan. 14, 2021

(30) Foreign Application Priority Data
Feb. 15, 2018     (DE) ................ 10 2018 202 335.2

(51) Int. Cl.
C25B 3/00     (2021.01)
C25B 9/19     (2021.01)
(Continued)

(52) U.S. Cl.
CPC ............... *C25B 9/19* (2021.01); *B01D 53/04* (2013.01); *C25B 1/00* (2013.01); *C25B 15/08* (2013.01);
(Continued)

(58) Field of Classification Search
CPC .. C25B 3/25; C25B 15/08; C25B 9/23; C25B 15/00; C25B 3/00; C25B 9/00;
(Continued)

(56) References Cited

U.S. PATENT DOCUMENTS

| 4,419,195 A | 12/1983 | Young |
| 2002/0178917 A1 | 12/2002 | Grunewald et al. |

(Continued)

FOREIGN PATENT DOCUMENTS

| CN | 103748724 A | 4/2014 |
| DE | 19716310 A1 | 10/1998 |

(Continued)

OTHER PUBLICATIONS

Charles Delacourt et al: "Design of an Electrochemical Cell Making Syngas (CO+H2) from C02 and H20 Reduction at Room Temperature", Journal of the Electrochemical Society, Bd. 155, Nr. 1, Seite B42, XP055124598, ISSN: 0013-4651, DOI: 10.1149/1.2801871 Zusammenfassunq; Seite B45, Spalte 2; Abbildung 3b; 2008.

(Continued)

*Primary Examiner* — Zulmariam Mendez
(74) *Attorney, Agent, or Firm* — Wolter Van Dyke Davis, PLLC (57) ABSTRACT

A device for the electrochemical production of a product containing CO, and a method for the electrochemical production of a product containing CO, in which a return of a material stream containing the educt and CO is carried out after the electrochemical production.

13 Claims, 2 Drawing Sheets

(51) Int. Cl.
*B01D 53/04* (2006.01)
*C25B 1/00* (2021.01)
*C25B 15/08* (2006.01)

(52) U.S. Cl.
CPC .. *B01D 2253/102* (2013.01); *B01D 2253/108* (2013.01); *B01D 2256/20* (2013.01); *B01D 2257/702* (2013.01)

(58) Field of Classification Search
CPC .. C25B 9/17; C25B 11/00; C25B 1/23; B01D 53/326; B01D 2257/504; B01D 53/1475; B01D 2256/22; B01D 53/1425; B01D 53/62; B01D 2256/20; B01D 2311/2649
See application file for complete search history.

(56) References Cited

U.S. PATENT DOCUMENTS

| | | | |
|---|---|---|---|
| 2013/0134049 A1 | 5/2013 | Teamey et al. | |
| 2014/0295301 A1 | 10/2014 | Ebbesen | |
| 2015/0038741 A1 | 2/2015 | Pedersen et al. | |
| 2016/0236173 A1 | 8/2016 | Witzleb et al. | |

FOREIGN PATENT DOCUMENTS

| | | |
|---|---|---|
| DE | 102013017123 A1 | 4/2015 |
| EP | 2898118 A2 | 7/2015 |
| EP | 2940773 A1 | 11/2015 |
| WO | 2013131778 A2 | 9/2013 |
| WO | 2014046796 A2 | 3/2014 |
| WO | 2014154253 A1 | 10/2014 |
| WO | 2015014527 A1 | 2/2015 |

OTHER PUBLICATIONS

Inouye and DeVan: Formation of iron carbonyl between a ½ pct Mo steel and high-pressure gases containing carbon monoxide, Journal of Materials for Energy Systems; 1 (1), 52-60, 1979; 1979.

PCT International Search Report and Written Opinion of International Searching Authority dated May 13, 2019 corresponding to PCT International Application No. PCT/EP2019/051257 filed Jan. 18, 2019.

METHOD FOR THE ELECTROCHEMICAL PRODUCTION OF A GAS PRODUCT CONTAINING CO

CROSS REFERENCE TO RELATED APPLICATIONS

This application is the US National Stage of International Application No. PCT/EP2019/051257 filed 18 Jan. 2019, and claims the benefit thereof. The International Application claims the benefit of German Application No. DE 10 2018 202 335.2 filed 15 Feb. 2018. All of the applications are incorporated by reference herein in their entirety.

FIELD OF INVENTION

The present invention relates to a facility for electrochemical production of a product containing CO and to a method for electrochemical production of a product containing CO, in which there is a return of a flow of material comprising educt and CO after the electrochemical production.

BACKGROUND OF INVENTION

There are currently great changes to be observed in the energy market. Fossil fuels are more and more falling into disrepute, since they cause a major part of global carbon dioxide emissions. At the same time there are large amounts of renewable energies available, but not always at the desired location at the desired time. One technical challenge is to produce added-value products from carbon dioxide $CO_2$ using surplus renewable energy. One approach is to produce gaseous added-value products, such as carbon monoxide CO for example, by electrochemical reduction of $CO_2$. These reactions can be carried out within $CO_2$ electrolyzers.

A great advantage of $CO_2$ electrolyzers is that they make it possible to produce CO decentrally and to do so in an order of magnitude in which at the present time they would be competitive with other technologies. As an alternative large amounts of CO would have to be transported over relatively long distances, which, as well as being less economical, also involves a significant potential danger.

A concept for $CO_2$ electrolyzers currently followed is based on what is known as a gas diffusion electrode, GDE. In this concept a gas phase usually lies on one side of the GDE and a liquid phase on the other side (catholyte). The $CO_2$ needed for the reaction usually originates from the gas phase, which then diffuses through a pore structure into the GDE. At what are known as the three-phase boundaries $CO_2$ can be reduced to CO, which can arrive back in the gas space through the pore system in the opposite direction to the $CO_2$.

Figure 1:
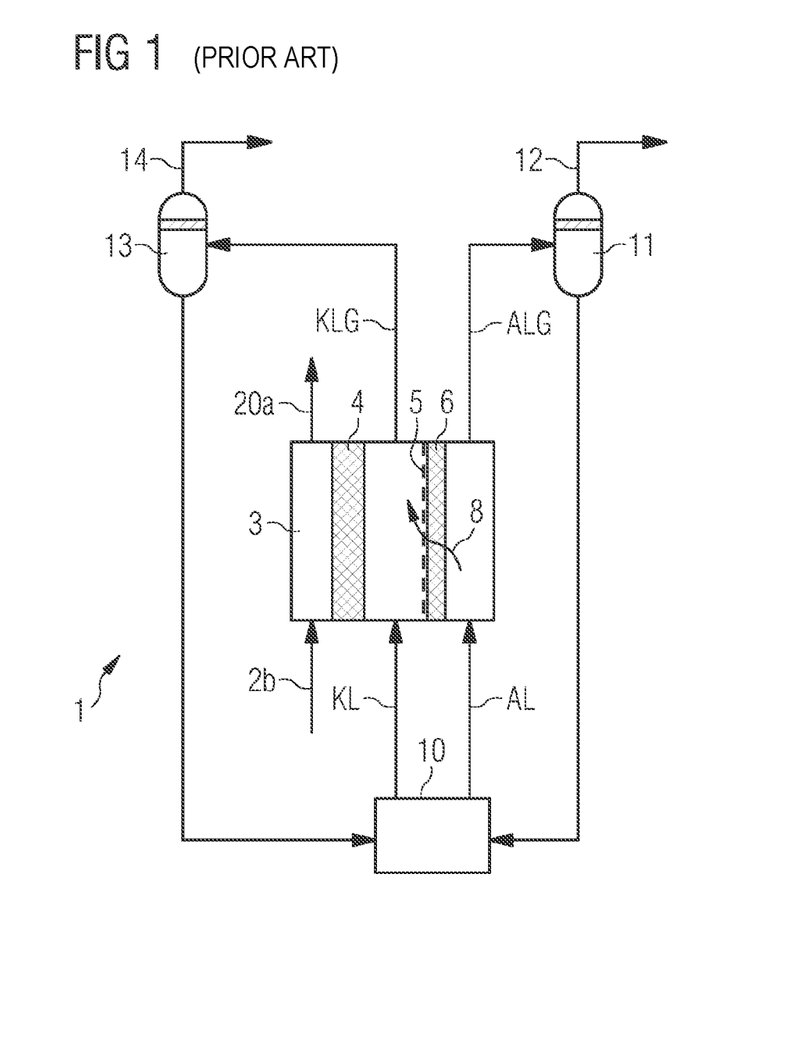
FIG. 1 shows a schematic of a prior-art electrolyzer.

FIG. 1 shows a schematic of the structure of an electrolyzer 1, here in the form of a $CO_2$ electrolyzer for example, as is known from the prior art.

$CO_2$, which is converted into a target product, arrives in the electrolysis cell 3, as shown in FIG. 1, via feed 2b, and does so in the area of the cathode space, in which the gas phase is present. Then a product gas or a gas mixture created, if necessary also with non-converted educt, can be taken away via the product gas discharge device 20a. The liquid catholyte KL is conveyed along on the opposite side of the GDE 4, which represents the cathode. There is also an anode space, in which the anode 6 is placed and to which the anolyte AL is conveyed. The anode space and the cathode space are divided by a separator 5, through which the ions 8 can pass. The separator 5 can be a membrane that lets cations pass through it for example (e.g. nafion) or a porous diaphragm. One task of the separator 5 is to keep gaseous substances separated from one another. After passing through the electrolysis cell 3 the catholyte KLG, now if necessary with gas phase, e.g. CO and the anolyte, now likewise if necessary with gas phase, e.g. $O_2$, can be combined with one another in a mixing container 10 for re-use in the electrolysis cell 3, however typically after any anode gas 12 arising, for example oxygen, has been separated off within a separation container 11, and a cathode gas 14 arising, e.g. hydrogen, has been separated off within a separation container 13.

The structure shown in FIG. 1 corresponds to a structure with "shared electrolyte" since, after each pass through the electrolysis cell, anolyte and catholyte are completely combined with one another in the mixing container. It is advantageous that the combinations of anolyte and catholyte cannot escape from one another in their combination during the electrolysis process. Changes in concentration, caused by a transport of specific ions through the separator 5 is thus always counteracted by the mixing. However dissolved gases, for example oxygen in the anolyte, can likewise be mixed in, which can make a subsequent separation necessary or can have an effect on the electrolysis.

Other configurations for $CO_2$ electrolyzers are known as well from the prior art, for example also with separate electrolyte conveyance.

Various designs of a low-temperature electrolysis are likewise described in the literature, for example in Delcourt et al. 2008, DOI 10.1149/1.2801871.

As well as low-temperature electrolysis, high-temperature electrolysis for electrochemical production of CO is possible and is also described in the literature, for example in WO 2014154253, WO 2013131778, WO 2015014527 and EP 2940773 A1.

An important characteristic of $CO_2$ electrolyzers is that usually there is no complete conversion of the $CO_2$ to CO. Instead a surplus of $CO_2$ is provided, so that a mixture of CO and $CO_2$ leaves the $CO_2$ electrolyzer as the gas mixture. Here the proportion of $CO_2$ can actually even be larger than the proportion of CO. Therefore, for an economical and sustainable process, the $CO_2$ should be separated off and conveyed back into the electrolyzer.

A first problem of the present invention is therefore to make available an efficient method of return for an educt after the passage of an electrolyte, in which a load on the facility can be reduced or even avoided, as well as a facility for such a method.

Figure 2:
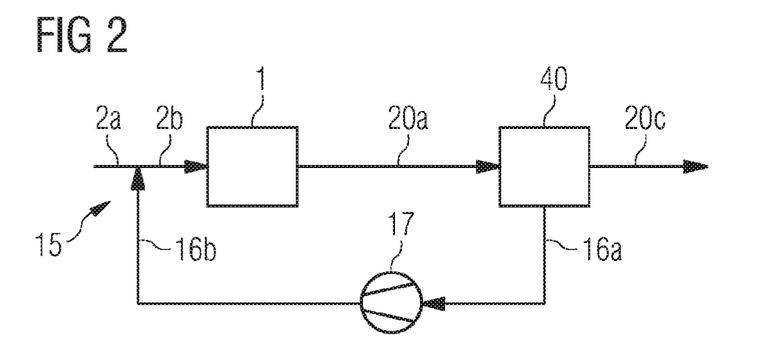
FIG. 2 shows a schematic of an electrolysis device with product separation and educt return.

To this end the inventors have designed a concept for an electrolyzer with a separation of the educt from the product flow and its return, which is shown schematically in an arrangement 15 in FIG. 2, e.g. with $CO_2$ containing CO from the product separation. Such a return is possible here for example in a $CO_2$ electrolyzer with return of $CO_2$, wherein in accordance with the invention the electrolyzer is not especially restricted, in particular not to the electrolyzer shown in FIG. 1. Herein an educt, e.g. $CO_2$, which can also possibly contain oil, is conveyed via the first feed device 2a, and educt, e.g. $CO_2$ and CO that can also possibly contain oil, is conveyed via the combined feed device 2b into the electrolysis cell 3. From said cell the product flow is introduced into the separation device 40 via the first discharge device 20a, which e.g. discharges $CO_2$ and CO as product.

In accordance with FIG. 2 a separation device 40 is provided for the separation of the product, for example a gas mixture comprising CO and $CO_2$, from the electrolyzer 1, which connects to the first discharge device 20a, wherein the product gas contains CO and $CO_2$ for example. Separated educt, for example $CO_2$, is conveyed via the return device 16a, 16b (subsequently referred to for short here as the return) back into the electrolyzer, wherein the return device is divided by the compressor 17 into an area of the return device before the compressor 16b, e.g. with returned $CO_2$ with CO before the compression and into an area of the return device after the compressor 16b, e.g. with returned $CO_2$ with CO after the compression. Essentially pure product 20c is separated off here in the separation device 40.

For a separation of for example only $CO_2$ and CO this concept functions, wherein usually a certain proportion of CO is likewise returned for electrolysis, since a complete cleaning both of the CO product flow and also of the $CO_2$ recycle flow would be very expensive.

Although it is theoretically possible to separate such a mixture in the separation device into pure CO and pure $CO_2$, the expense would however be significant for such a perfect separation. Instead, in practical cases the aim is for a less perfect separation, so that for example a small proportion of $CO_2$, tolerable for the product specification, can get into the product gas and CO in a relatively large proportion can get into the return. The return of CO does not represent any greater problem in principle.

Accordingly the gas separation in the separation device 40 is usually designed so that the proportion of $CO_2$ that gets into the product is only as large as the product requirement allows, while the proportion of returned CO can be significant however and can readily be present as a two-digit percentage volume range.

The introduction of CO into the $CO_2$ electrolyzer even has certain advantages for the latter, since in this way a more even gas composition is present over the entire cell surface.

However, because of the CO present in pipelines of the return, iron and nickel carbonyls can form, in particular when favorable pipe material based on iron and steel is used and/or higher partial pressures on CO are present. This is also true for the inner surfaces of the compressor. Since these involve the materials generally best suited for pipelines and compressors subjected to pressure it is possible that iron or nickel carbonyls, which will then be transported into the $CO_2$ electrolyzer 1, will form.

The problem of metal deposits through decay of carbonyls in reactors, which then have a catalytic effect and reduce the product selectivity, is described for methanization reactors for production of synthetic natural gas from synthetic gas, e.g. in Inouye and DeVan: Formation of iron carbonyl between a ½ pct Mo steel and high-pressure gases containing carbon monoxide, Journal of Materials for Energy Systems, 1 (1), 52-60, 1979.

The formation of carbonyls can occur in a CO-rich gas atmosphere. Here CO reacts with metals such as e.g. iron and nickel made of metallic materials to form iron or nickel carbonyl for example. The carbonyls are not stable at higher temperatures and decay again. At very low temperatures the formation of carbonyls is kinetically impeded.

The problem with this is that the carbonyls can break down in an electrolyzer, e.g. a $CO_2$ electrolyzer, and the decomposition products iron or nickel can be deposited on electrodes, for example the cathode. The inevitable consequence here is a reduction in the selectivity of the cathode, in the case of a $CO_2$ electrolyzer with aqueous electrolytes for example, with simultaneous formation of hydrogen, so that the product specifications cannot be maintained over the long term after the start of operation.

Estimations on the part of the inventors have shown that under unfavorable conditions this can occur after a few hundred hours of operation, so that this problem can on no account be ignored in the concept considered.

A similar problem, which can lead to a degradation of the electrodes, especially of a GDE, is the addition of oils to the $CO_2$ electrolyzer. These oils can likewise be present in the gas flows, wherein their origin frequently lies in the compressors used, wherein oils can possibly also be present in the educt itself. It is in particular only possible to avoid contact occurring between the oil necessary for lubrication of the compressors and the gas flow at great expense.

Even when oils often only have a low vapor pressure, small amounts can already block the active surface of an electrode, in particular of a GDE that, along with the degradation caused by carbonyls, represents a further problem of the present invention to be solved.

SUMMARY OF THE INVENTION

It has been shown that electrolysis cells, and in particular the GDEs of $CO_2$ electrolyzers, can be very sensitive to multivalent metal ions, but also to contaminations by oils. Even if a gas entering them has only slight contaminations of a maximum of 1 ppm of oil or a few ppb of carbonyls, there are likely to be adverse effects on the electrolysis, for example a $CO_2$ electrolysis. When carbonyls are added the selectivity of the cathodes could fall for example, so that hydrogen could be formed thereby, and in consequence a very expensive gas separation would be necessary for the provision of pure product gas, e.g. CO, or the composition of the product no longer meets the predetermined specification.

Surprisingly it has been shown that significant amounts of carbonyls can already be produced by the use of compressors or steel pipes, which would be harmful for the concept contemplated of returning the educt. This means in other words that a system from the prior art could contaminate itself even after a relatively short phase of operation. This problem is not described in the literature since electrolyzers are usually tested without a return.

The inventors have found that there is a favorable solution for this set of problems. By providing a cleaning device such as an active guard bed the amount of harmful contaminants can be significantly reduced, so that long periods of operation of electrolysis of for example over 40000 hours are possible. Even when the amounts of contaminants in a return in respect of a degradation of an electrolysis cell, e.g. of a GDE were assessed as being to high, it is relatively small in relation to usual cleaning devices, e.g. a usual loading of active carbon filters in guard beds, so that checking and if necessary cleaning of cleaning devices even after technically sensible periods of time is sufficient. Thus filters, as technical cleaning devices, can be checked and if necessary replaced at technically sensible intervals, e.g. of 4000-8000 operating hours for example.

In a first aspect the present invention relates to a facility for electrochemical production of a product contain CO, comprising—an electrolysis cell comprising an anode and a cathode;—a combined feed device, which is connected to the electrolysis cell and supplies the electrolysis cell with a combined flow of material comprising a first educt flow and a flow of material to be returned comprising CO, which is embodied to supply the electrolysis cell with the combined flow of material comprising the first educt flow and the flow of material to be returned comprising CO;—a first feed device, which is connected to the combined feed device and feeds the first educt flow to the combined feed device, which is embodied to feed the first educt flow to the combined feed device;—a first discharge device, which is connected to the electrolysis cell and discharges from the electrolysis cell a first product flow comprising CO, which is embodied to discharge from the electrolysis cell the first product flow comprising CO and to feed the first product flow to a separation device;—the separation device, which is connected to the first discharge device and separates the flow of material comprising CO to be returned from the first product flow comprising CO, which is embodied to separate the flow of material comprising CO to be returned from the first product flow comprising CO; and—a return device, which is connected to the separation device and is connected to the combined feed device and feeds the flow of material comprising CO to be returned to the combined feed device, which is embodied to feed the flow of material comprising CO to be returned to the combined feed device; further comprising at least one cleaning device, which removes carbonyls and/or oils from the first product flow comprising CO, from the flow of material comprising CO to be returned and/or from the combined flow of material comprising the first educt flow and the flow of material comprising CO to be returned and which is embodied to remove carbonyls and/or oils from the first product flow comprising CO, the flow of material comprising CO to be returned and/or the combined flow of material comprising the first educt flow and the flow of material comprising CO to be returned and which is arranged accordingly in the first discharge device, in the return device and/or in the combined feed device.

Also disclosed is a method for electrochemical production of a product containing CO, comprising: introducing a first educt flow into the first feed device of an inventive facility; feeding the first educt flow to the electrolysis cell; converting the first educt flow to a first product flow comprising CO; discharging the first product flow comprising CO from the electrolysis cell; separating a flow of material to be returned comprising CO from the first product flow comprising CO in the separation device; and returning the flow of material to be returned comprising CO to the combined feed device, wherein by means of the at least one cleaning device carbonyls and/or oils are removed from the first product flow comprising CO, from the flow of material comprising CO to be returned and/or from the combined flow of material comprising the first educt flow and the flow of material comprising CO to be returned.

Further aspects of the present invention are to be found in the dependent claims and the more detailed description.

BRIEF DESCRIPTION OF THE DRAWINGS

The enclosed drawings are intended to illustrate forms of embodiment of the present invention and to impart a further understanding of these. In conjunction with the description they serve to explain the concepts and principles of the invention. Other forms of embodiment and many of the stated advantages emerge in respect of the drawings. The elements of the drawings are not necessarily shown true-to-scale in relation to one another. Elements, features and components that are the same, have the same function and work in the same way are labeled in the figures of the drawings, unless stated otherwise, with the same reference characters in each case.

DETAILED DESCRIPTION OF INVENTION

Unless defined in another way, technical and scientific expressions used herein have the same meaning as would generally be understood by a person skilled in the art in the specialist area of the invention.

Quantity specifications within the framework of the present invention relate to percentage by weight unless specified otherwise or obvious from the context.

Gas diffusion electrodes (GDE) in general are electrodes in which liquid, solid and gaseous phases are present, and where in particular a conductive catalyst can catalyze an electrochemical reaction between the liquid and the gaseous phase.

The embodiment can differ in its nature, for example as a porous "full material catalyst" possibly with auxiliary layers for adapting the hydrophobicity; or as a conductive porous carrier, onto which the catalyst can be applied in a thin layer.

Within the framework of the invention synthetic gas is a gas mixture that essentially comprises hydrogen and carbon monoxide. The volume ratio of $H_2$ to CO here is not especially restricted and can for example lie in a range of 10:1 to 1:10, for example 5:1 to 1:5, e.g. 3:1 to 1:3, wherein other ratios can be suitably set in respect of further use.

The product containing CO is not especially restricted, provided carbon monoxide is contained in it. For example it can essentially be CO or synthetic gas.

Normal pressure is 101325 Pa=1.01325 bar.

In a first aspect the present invention relates to a facility for electrochemical production of a product containing CO, comprising—an electrolysis cell comprising an anode and a cathode; —a combined feed device, which is connected to the electrolysis cell and supplies the electrolysis cell with a combined flow of material comprising a first educt flow and a flow of material to be returned comprising CO, which is embodied to supply the electrolysis cell with the combined flow of material comprising the first educt flow and the flow of material to be returned comprising CO;—a first feed device, which is connected to the feed device and feeds the first educt flow to the combined feed device, which is embodied to feed the first educt flow to the combined feed device;—a first discharge device, which is connected to the electrolysis cell and discharges from the electrolysis cell a first product flow comprising CO, which is embodied to discharge from the electrolysis cell the first product flow comprising CO and to feed the first product flow to a separation device;—the separation device, which is connected to the first discharge device and separates the flow of material comprising CO to be returned from the first product flow comprising CO, which is embodied to separate the flow of material comprising CO to be returned from the first product flow comprising CO; and—a return device, which is connected to the separation device and is connected to the combined feed device and feeds the flow of material comprising CO to be returned to the combined feed device, which is embodied to feed the flow of material comprising CO to be returned to the combined feed device; further comprising at least one cleaning device, which removes carbonyls and/or oils from the first product flow comprising CO, from the flow of material comprising CO to be returned and/or from the combined flow of material comprising CO, and/or from the combined flow of material comprising the first educt flow and the flow of material comprising CO to be returned and which is embodied to remove carbonyls and/or oils from the first product flow comprising CO, from the flow of material comprising CO to be returned and/or from the combined flow of material comprising the first educt flow and the flow of material comprising CO to be returned and which is arranged accordingly in the first discharge device, in the return device and/or in the combined feed device.

In the inventive facility the corresponding components are embodied here in accordance with specified forms of embodiment so that the first educt flow, the first product flow comprising CO, the flow of material comprising CO to be returned and/or the combined flow of material comprising the first educt flow and the flow of material comprising CO to be returned are advantageously present as essentially flows of gas, wherein said flows can be moistened if necessary. Thus the corresponding flows in the inventive method are advantageously essentially flows of gas, advantageously flows of gas. After separation of the flow of material comprising CO to be returned and if necessary further product flows from the first product flow an essentially pure product flow remains, which advantageously essentially comprises CO or essentially comprises synthetic gas. The first product flow, for example a gas mixture, can thus be directed in accordance with specific forms of embodiment into the separation device, from which for example with a $CO_2$ conversion in the electrolysis cell, on the one hand CO with advantageously a purity of at least 95% percent by volume or synthetic gas ($H_2$ and CO in total) with a purity of at least 95% percent by volume related to the essentially pure product flow, and on the other hand a flow of material to be returned comprising CO comprising a mixture of essentially $CO_2$ and CO can be discharged.

A gas separation in the separation device with gas flows is however, even in the separation of $CO_2$ that counts as relatively simple, never completely selective. This means that at least one gas flow after the separation, i.e. for example the essentially pure product flow and/or the flow of material to be returned comprising CO, contains a significant proportion of the undesired complementary gas. In the layout of the $CO_2$ separation from the product gas mixture for example it can thus be chosen whether $CO_2$ remains in the product or CO gets back into the return. Since the product for example is to be essentially pure CO or synthetic gas (e.g. purities>95% by volume), the aim is thus the latter. Accordingly in the inventive method and also in use of the inventive facility in such a method, a significant part of the CO gets into the return. The proportion of CO in the return here can readily lie in the low two-digit percentage by volume range, i.e. in the range of 1 to 50% by volume, advantageously 5 to 30% by volume, especially advantageously 10% by volume to 20% by volume, wherein cases outside these limits are also conceivable. This can, as explained above lead to the formation of carbonyls, wherein carbonyls can also be formed already or instead of this with the first product flow. These will be cleaned as explained below.

In the inventive facility the electrolysis cell is not especially restricted, provided it has an anode and a cathode. The anode and cathode themselves are also not especially restricted, wherein advantageously at least one of them is provided as a gas diffusion electrode. The material of the respective electrodes here can be adapted to a desired electrochemical reaction. Thus for example the cathode can comprise a material that can produce CO from $CO_2$, for example a metal such as Ag, Au, Zu, Pd etc.

Moreover at least one power supply for the electrolysis cell is naturally also included. Further parts of the facility that occur in electrolysis cells can be provided in the electrolysis cell, such as for example one or more separators, e.g. at least one membrane, cooling devices, an educt supply for the second electrode, e.g. the anode, an electrolyte supply, an electrolyte discharge etc. In the electrolysis cell educts and electrolyte can be moved in the same flow and also in the opposite flow, and the supply of these is possible from any side, i.e. for example from below on the floor and also from the upper end of the electrolysis cell, such as for example with falling film electrodes.

A product flow, in particular a product gas flow, can emerge from the electrolysis cell, for example from a $CO_2$ electrolyzer. In accordance with specific forms of embodiment this essentially contains CO and educt, for example CO and $CO_2$.

The inventive facility comprises an electrolysis cell and, in particular for reasons of describing it in a simple manner, is described by one electrolysis cell. This does not however exclude more than one electrolysis cell being present in the facility, i.e. for example a stack of electrolysis cells or also a number of stacks of electrolysis cells, wherein the number of electrolysis cells per stack is also not restricted here. The arrangement of the stacks is not especially restricted, and these can for example be arranged behind one another or parallel in the direction of flow of the first product flow. The corresponding arrangement of the electrolysis cells or stacks can be undertaken here in a suitable manner, as for example can the supply of power etc. For example, with an arrangement of electrolysis cells behind one another the supply is via the combined supply device to the first electrolysis cell lying in the direction of flow of the product flow and the discharge is via the first discharge device from the last electrolysis cell lying in the direction of flow of the product flow, wherein the individual electrolysis cells are suitably connected to one another in the stack. With a parallel arrangement flows of substances can also be separated or merged accordingly. In this regard the facility is not especially restricted.

Moreover the combined supply device that is connected to the electrolysis cell and supplies the electrolysis cell with a combined flow of material comprising a first educt flow and a flow of material comprising CO to be returned (also referred to below as the "combined flow of material"), which is embodied to supply the electrolysis cell with the combined flow of material comprising the first educt flow and a flow of material to be returned comprising CO, is not especially restricted. It serves to let educt arrive in the electrolysis cell, which is present both as newly supplied educt in the first educt flow and also as returned educt in the flow of material to be returned comprising CO. For example the first educt flow and also the flow of material to be returned comprising CO can comprise a first educt, which is suitably supplied to the cathode or anode, especially to the cathode. The combined supply device is thus for example embodied in such a way as to feed the combined flow of material to the cathode or anode, especially to the cathode.

The first educt flow here is not especially restricted and can for example be an essentially pure educt, but in accordance with specific forms of embodiment can also comprise CO. In accordance with specific forms of embodiment the first educt flow comprises $CO_2$. In accordance with specific forms of embodiment at least 50% by volume, advantageously at least 80% by volume, further advantageously at least 90% by volume, especially at least 95% by volume, for example 99% by volume, e.g. also up to 100% by volume of the first educt flow consists of $CO_2$.

Also the flow of material to be returned comprising CO is not further restricted, provided it comprises CO and unconverted educt. In accordance with specific forms of embodiment the flow of material to be returned comprising CO essentially consists of educt, e.g. $CO_2$ and CO, wherein their ratio is not especially restricted and can be adapted for example to the reaction and the turnover in the electrolysis cell. In accordance with specific forms of embodiment the volume returned with the flow of material to be returned comprising CO per unit of time is as the volume of a first educt flow supplied in the same unit of time to the first educt flow.

The combined supply device can be suitably adapted in respect of its embodiment, especially in respect of a volume throughput to the volume flows of the first educt flow and of the flow of material to be returned comprising CO. It can connect suitably to the electrolysis cell. Its further embodiment is not especially restricted and it can be provided for example as a pipe, a line etc. Also the material of which this consists is not especially restricted.

Moreover the first feed device, which is connected to the combined supply device and supplies the combined feed device with the first educt flow and which is embodied to supply the combined feed device with the first educt flow is not especially restricted. It serves to supply the educt flow, which can be composed as described above and is connected to the combined feed device. It can also for example be provided as a pipe, line etc. The manner in which the first feed device is supplied with the first educt flow is not especially restricted, and the first educt flow can be filled for example from a suitable first educt source, for example a combustion system in which $CO_2$ arises, an educt store, e.g. $CO_2$ store etc. The material of the first feed device is also not especially restricted.

Likewise the first discharge device, which is connected to the electrolysis cell and discharges from the electrolysis cell a first product flow comprising CO, which is embodied to discharge a first product flow containing CO from the electrolysis cell and to feed the product flow to a separation device, is not especially restricted in respect of embodiment, material etc. This too can be provided as a pipe, line etc. It serves to discharge the first product flow from the electrolysis cell and supply it to a separation device.

Moreover the separation device, which is connected to the first discharge device and separates from the first product flow comprising CO the flow of material to be returned comprising CO and which is embodied to separate from the first product flow comprising CO the flow of material to be returned comprising CO, is not especially restricted. For example it can be provided as a separation device for gases, for example when $CO_2$ is converted into CO in the electrolysis cell. The corresponding embodiment can thus correspond to the usual separation devices in electrolysis cells with educt return, as are known for $CO_2$ electrolysis for example.

In accordance with specific forms of embodiment the separation device comprises a separation membrane an adsorbent, an absorbent, a condenser, a distillation unit and/or a second heating device. The separation device is thus based, in accordance with specific forms of embodiment, on the technology of adsorption, absorption, membrane separation, condensation, distillation, thermal decomposition, catalyst-assisted decomposition, thermal decomposition with catalyst assistance or on a combination of these technologies. The use of these techniques is not especially restricted and can be adapted to an educt to be returned and also to a product to be separated and also to further by-products if necessary. For example carbon dioxide can be separated as an educt of carbon monoxide as product through adsorption of carbon dioxide, freezing out etc. In accordance with specific forms of embodiment at least one product, advantageously comprising CO, is separated for an educt to be returned, which comprises CO, for example $CO_2$, wherein CO also remains in the $CO_2$ to be returned.

The separation device, which can also be referred to below as the separation unit, can be embodied so that likewise hydrogen, which can likewise be present in a product gas mixture of the electrolysis cell—for example in an electrolysis of $CO_2$ with aqueous electrolytes and/or after moistening, is separated and is conveyed into a further flow of gas. In this case, in accordance with specific forms of embodiment, the volume ratio of $H_2$ to CO of the gas mixture entering the separation device is advantageously greater than in the product flow after its passage through the separation device, i.e. for example the essentially pure CO gas flow in accordance with specific forms of embodiment. The separation device can however also be configured so that the hydrogen with the CO forms a synthetic gas product after passing through the unit.

Furthermore the one return device, which is connected to the separation device and the combined feed device and feeds the flow of material to be returned comprising CO to the combined feed device, which is embodied to feed the flow of material to be returned comprising CO to the combined feed device, is likewise not further restricted in respect of material, form, embodiment etc., and can likewise be a pipe, a line etc.

The inventive facility is furthermore characterized in that at least one cleaning device is provided, which removes carbonyls and/or oils from the first product flow comprising CO, the flow of material to be returned comprising CO and/or the combined flow of material comprising the first educt flow and the flow of material to be returned comprising CO, which is embodied to remove carbonyls and/or oils from the first product flow comprising CO, the flow of material to be returned comprising CO and/or the combined flow of material comprising the first educt flow and the flow of material to be returned comprising CO and which is accordingly arranged in the first discharge device, in the return device and/or in the combined feed device. Depending on the way in which the electrolysis cell is operated as well as on the type of first discharge device, the return device and/or the combined feed device, for example their materials, and also on further elements in the inventive facility, such as for example at least one compressor, various embodiments are produced here as regards the placing of the at least one cleaning device, which will be described below, but do not restrict the facility however. Naturally it is also possible to provide more than one cleaning device in the inventive facility.

The at least one cleaning device can be suitably provided within the first discharge device, the return device and/or the combined feed device, so that it can divide the corresponding device if necessary into two areas or sections or parts, which can be suitably connected to the at least one cleaning device. As an alternative it can be provided at connection points of the first discharge device, the return device and/or the combined feed device to other devices, e.g. the separation device and/or the electrolysis cell, the separation device and/or the combined feed device and or the first feed device and/or the electrolysis cell, related in each case to the first discharge device, the return device and/or the combined feed device. In respect of its embodiment the at least one cleaning device is not especially restricted, provided it can remove carbonyls and/or oils from the first product flow comprising CO, the flow of material to be returned comprising CO and/or the combined flow of material comprising the first educt flow and the flow of material to be returned comprising CO.

In accordance with specific forms of embodiment the at least one cleaning device is chosen from a washer to dissolve and/or break down carbonyls and/or oils in a suitable solvent, which is embodied to dissolve and/or break down carbonyls and/or oils in a suitable solvent; a guard bed comprising a substance for adsorption and/or absorption of carbonyls and/or oils, which is embodied to adsorb carbonyls and/or oils on the substance for adsorption and/or absorption of carbonyls and/or oils and/or to absorb into the substance for adsorption and/or adsorption of carbonyls and/or oils; a discharging device; an irradiation device with an irradiation wavelength of below 450 nm, advantageously below 400 nn; and/or a first heating device to break down carbonyls and/or oils, which is embodied to break down the carbonyls and/or oils thermally, if necessary with the assistance of a catalyst—that is not restricted.

In accordance with specific forms of embodiment the cleaning device is a guard bed comprising a substance for adsorption and/or absorption of carbonyls and/or oils, advantageously with an adsorbent substance, in particular with active carbon and/or a zeolite and/or a mixture of different solids, advantageously with a large specific surface of at least 10 m$^2$/g, especially advantageously of at least 100 m$^2$/g. In accordance with specific forms of embodiment the guard bed is designed for a loading with carbonyls of 0.1 to 10 percent by weight, relative to the solids of the guard bed, e.g. depending on pressure and conditions of the adsorption.

In accordance with specific forms of embodiment the guard bed comprises a regeneration, so that deposited metal can be regularly removed for example.

Likewise the at least one cleaning device can be a facility with an addition of water, acids or especially alkalis, which as a washer assists the breaking down of carbonyls, wherein the acids and alkalis are not especially restricted. As an alternative or in addition the at least one cleaning device can comprise a physical wash, e.g. with an organic solvent such as methanol or oxymethelene ether (OME), in which the carbonyls dissolve especially well. To this end for example the corresponding flow can be conveyed through a corresponding bath.

As an alternative or in addition the at least one cleaning device can also comprise a thermal decomposition, in which CO is released again from the carbonyls. The decomposition in this case can if necessary also be assisted by a catalyst.

A combination of the said methods for cleaning is also in the spirit of the invention. As well as the guard bed comprising a substance for adsorption and/or absorption of carbonyls and/or oils, which has the advantage that carbonyls and oils are removed from the gas flow, in particular a thermal decomposition with subsequent water quench by a moistener is especially advantageous. The latter combination has the advantage that the gas flow entering the electrolysis cell can be moistened with this, which is advantageous for the electrolysis cell or also the electrolyzer. In accordance with specific forms of embodiment or the at least one cleaning device thus comprises or is a first heating device to break down carbonyls and/or oils, wherein a moistener is connected in the flow direction after the at least one cleaning device, in which water is supplied to the first product flow comprising CO, the flow of material to be returned comprising CO and/or the flow of material to be cleaned comprising the first educt flow and the flow of material to be returned, and which is embodied to feed water to the first product flow comprising CO, the flow of material to be returned comprising CO and/or to the cleaned flow of material comprising the first educt flow and the flow of material to be returned comprising CO.

The cleaning device is placed in accordance with specific forms of embodiment before, advantageously directly before, the electrolysis cell, for example a $CO_2$ electrolysis cell, since this often represents the most sensitive point in relation to carbonyls and oils. The advantage of placing the cleaning device directly before the electrolysis cell, for example a $CO_2$ electrolysis cell, is that the various feed and discharge facilities and also the return devices, for example pipes, do not have to be subject to the very highest demands as regards the choice of material. A slight formation of carbonyls can also be tolerated, Furthermore contaminating oils, which could already be present in the educt $CO_2$, are likewise separated out and in this way especially do not lead to a degradation of a GDE of the electrolysis cell.

However it can also be sensible for the at least one cleaning device to be placed before the separation device, when said device is especially sensitive to oils and/or carbonyls for example. Basically it is a feature of the invention that the at least one cleaning device is placed within the circuit consisting of electrolysis cell, separation device, return and combined feed as well as if necessary at least one compressor.

A further option for the at least one cleaning device is a discharge device that, with a sufficiently high proportion of oxygen, can break down carbonyls in the first product flow comprising CO, the flow of material to be returned comprising CO and/or the combined flow of material comprising the first educt flow and the flow of material to be returned comprising CO. The possibility thus arises of e.g. having an electrical discharge ignited in a part of the corresponding flow, wherein through the high proportion of oxygen in the components of the gas, the carbonyls arising can be safely broken down. As an alternative or in addition to the gas discharge, hard UV radiation below 450 nm, advantageously below n400 nm, can destroy the carbonyls.

In accordance with specific forms of embodiment the inventive facility comprises at least one compressor, which is arranged in the direction of flow in the first product flow comprising CO, in the flow of material to be returned comprising CO and/or in the combined flow of material comprising the first educt flow and the flow of material to be returned comprising CO before the at least one cleaning device in the first discharge device, in the return device and/or in the combined feed device. The compressor serves here to compress the flow for an enhanced return of the flow of material to be returned and/or for the feed to the electrolysis cell.

For the operation of the electrolysis cell there are principally two operating variants to be considered, namely a pressure electrolysis and a low-pressure electrolysis. Depending on the variant chosen advantageous positions are produced for the at least one compressor in the inventive facility, as will be set out below. In the inventive facility the electrolysis cell can thus be operated at a different pressure level, so that a compressor can be provided at different positions, e.g. in the return device, as will be shown later in conjunction with FIG. 3, or between the electrolysis cell and the separation device, as will be shown later in conjunction with FIG. 4.

In the variant of a pressure electrolysis with overpressure in the electrolysis cell in relation to the ambient pressure the product gas flow is under pressure, which is helpful for the subsequent gas separation in the separation device, since in this case higher propulsive forces are available for a separation. As a rule a separated gas leaves the separation device at a lower pressure, so that the flow of material to be returned comprising CO can be at a lower pressure, for example at approximate ambient pressure, e.g. normal pressure. In order to make the return possible, in this variant this flow of material to be returned, for example as a flow of gas, is compressed with a compressor in accordance with specific forms of embodiment. The flow of material to be returned, for example the flow of gas, can then be combined with the first educt flow, e.g. comprising or consisting of $CO_2$. Here the at least one cleaning device is advantageously located in the direction of flow beyond the compressor, i.e. in the return device and/or combined feed device, advantageously at least in the combined feed device. The increased pressure likewise helps at this point in the inventive removal of undesired oils and/or carbonyls.

In $CO_2$ electrolysis in particular the pressure of the flow of material to be returned, e.g. of a mixture of gas, is therefore increased with at least one compressor, so that it can be returned in pressure electrolysis.

Since oil in the flow of material to be returned, in particular in a gas mixture, would disrupt the process, the at least one compressor is advantageously embodied as a dry runner, in which a contact between lubricating oils and the respective flow of material, in particular a gas or gas mixture, is avoided. Corresponding considerations naturally also apply to the first product flow, since oil also causes disruption in the separation device, and also for the combined flow of material. In accordance with specific forms of embodiment the at least one compressor is therefore thus embodied in such a way that the first product flow comprising CO, the flow of material to be returned comprising CO and/or the combined flow of material comprising the first educt flow and the flow of material to be returned comprising CO does not come into contact with oil used in the compressor.

However an increase in the partial pressure of CO arises through the compression, which promotes an undesired formation of carbonyls from metals of the pipelines and/or of the compressor. Accordingly these can then be removed, if necessary together with oils from the first product flow comprising CO, the flow of material to be returned comprising CO and/or the combined flow of material comprising the first educt flow and the flow of material to be returned comprising CO, in the at least one cleaning device. Provided the at least one cleaning device is present in the combined feed device, oils and/or carbonyls also possibly present in the first educt flow, for example oils possibly present in an educt $CO_2$, can be removed, for example when the $CO_2$ stems from a combustion.

In a low-pressure electrolysis on the other hand, the electrolysis runs at pressures in the range of the ambient pressure, e.g. essentially at normal pressure. A disadvantage of this variant is that a first educt flow present under pressure, e.g. comprising or consisting of $CO_2$, must be depressurized and the first product flow must advantageously be compressed again after the electrolysis, before it is fed into the separation device. The at least one compressor here is accordingly advantageously provided at least on the first discharge device. As a consequence there is usually likely to be a higher demand for compression. However the advantage of an atmospheric electrolysis or low-pressure electrolysis is that the electrolysis cell can be constructed more simply, since a few valves, for pressure regulation for example, can be omitted.

Furthermore in the choice of material of the first discharge device, the return device and/or the combined feed device in this variant, for example pipelines, there can also be recourse to materials such as plastics, which do not tend to form carbonyls. Furthermore any contaminations that are caused by the at least one compressor, with an arrangement in the discharge device, first arrive in the separation device. Frequently a robust technology is employed within the separation device, which can thus at be least tolerant with regard to carbonyls and oils.

In accordance with specific forms of embodiment, in low-pressure electrolysis too, the at least one compressor is embodied in such a way that the first product flow comprising CO, the flow of material to be returned comprising CO and/or the combined flow of material comprising the first educt flow and the flow of material to be returned comprising CO does not come into contact with oil used in the compressor.

In accordance with specific forms of embodiment the first discharge device, the return device and/or the combined feed device in the flow direction behind the at least one cleaning device, at least in the parts that come into contact with the first product flow comprising CO, the flow of material to be returned comprising CO and/or the combined flow of material comprising the first educt flow and the flow of material to be returned comprising CO, consists of a material or is coated with a material that is selected from iron and nickel-free metallic materials, plastic, steels containing Cr and/or mixtures thereof. This enables a renewed formation of carbonyls in the direction of flow after the at least one cleaning device to be avoided.

A further aspect of the invention is thus the use of suitable materials or coatings downstream of the at least one cleaning device for removing the carbonyls and of the electrolysis cell. Suitable for this for example are materials, e.g. for pipelines, made of iron and nickel-free materials downstream of the at least one cleaning device, e.g. of a guard bed and/or moistener, e.g. made of copper, aluminum, titanium or plastic; inner coatings, e.g. for pipelines, downstream of the at lest one cleaning device, e.g. of a guard bed and/or moistener, e.g. plastic coatings, Teflon coatings and/or chrome coatings and/or steels containing chrome for avoiding carbonyl formation.

In accordance with specific forms of embodiment the first discharge device, the separation device, the return device, the at least one cleaning device and/or in the combined feed device and/or if necessary the at least one compressor, at least in the parts that that come into contact with the first product flow comprising CO, the flow of material to be returned comprising CO and/or the combined flow of material comprising the first educt flow and the flow of material to be returned comprising CO, consists of a material or is coated with a material that is selected from iron and nickel-free metallic materials, plastic, steels containing Cr and/or mixtures thereof. This enables formation of carbonyls to be reduced or even prevented even before the at least one separation device. Thus, in accordance with specific forms of embodiment, measures are taken that impede the formation of carbonyls within the first discharge device, the separation device, the return device, the at least one cleaning device and/or in the combined feed device and/or if necessary the at least one compressor, e.g. of a pipeline system. These can thus be materials, e.g. pipelines that contain no carbonyl-forming substances. Examples of materials that come into consideration are iron and nickel-free metallic materials, plastics, titanium or copper, and also steels containing Cr. Also in the spirit of the invention are components and/or devices coated on the inside with these materials, e.g. steel pipes.

In accordance with specific forms of embodiment the inventive facility further contains a deoxo unit, which is located in the first discharge device and is embodied to remove oxygen from the first product flow containing CO. In particular the deoxo unit, in accordance with specific forms of embodiment, is provided between the electrolysis cell and the separation device, in order to remove traces of oxygen.

A further aspect of the present invention is directed to a method for electrochemical production of a product containing CO, comprising: introducing a first educt flow into the first feed device of an inventive facility; feeding the first educt flow to the electrolysis cell; converting the first educt flow to a first product flow comprising CO; discharging the first product flow comprising CO from the electrolysis cell; separating the flow of material to be returned comprising CO from the first product flow comprising CO into the separation device; and returning the flow of material to be returned comprising CO to the combined feed device, wherein by means of the at least one cleaning device carbonyls and/or oils are removed from the first product flow comprising CO, the flow of material to be returned comprising CO and/or the combined flow of material comprising the educt flow and the flow of material comprising CO to be returned.

In the method at least one cleaning device is thus provided to separate any carbonyls and if necessary contaminations from oil. This at least one cleaning device is not especially restricted, as already described above, and can be an active carbon guard bed, or also another suitable cleaning device specified above. The at least one cleaning device is advantageously arranged within the circuit of electrolysis cell, separation device and compressor.

In accordance with specific forms of embodiment the first educt flow is a gas flow that comprises $CO_2$. Here the electrolysis cell, e.g. a $CO_2$ electrolyzer, can convert a part of $CO_2$ supplied into CO, so that a gas mixture is produced, which in accordance with specific forms of embodiment, essentially consists of $CO_2$ and CO or of $CO_2$ and synthetic gas.

In accordance with specific forms of embodiment the first educt flow is a gas flow that is introduced under increased pressure into the first feed device, wherein advantageously the at least one cleaning unit is provided in the combined feed device.

In accordance with specific forms of embodiment the first educt flow is a gas flow that is introduced under increased pressure into the first feed device, wherein the first product flow comprising CO is compressed.

In accordance with specific forms of embodiment the at least one cleaning unit is arranged after a compressor for compressing the first product flow comprising CO and before the separation device.

In accordance with specific forms of embodiment a second product flow comprising hydrogen and if necessary CO is separated from the first product flow comprising CO in the separation unit.

The invention can likewise be applied to a joint production of $H_2$ and CO (such as e.g. in synthetic gas) in a co-electrolysis. Even in such a method non-converted $CO_2$ can be separated from synthetic gas with similar separation techniques and CO can be present in the returned $CO_2$, which, depending on partial pressure, leads to the same carbonyl problems. A similar design is produced to the $CO_2$ electrolysis for a CO product described here.

However it should be noted here that a separation of CO and $H_2$ is only possible at relatively great expense. As a consequence it should therefore be ensured that the undesired formation of $H_2$ at an electrode of the electrolysis cell, e.g. the cathode, for example as the GDE, is tolerable for the product specification. This can be guaranteed by using a suitable cathode material, such as for example silver, which has a high overvoltage for the formation of $H_2$. In particular the $H_2$ formation should be tolerable for a CO product. If synthetic gas is to be produced, typical synthetic gas ratios can arise for example with volume ratios of e.g. $H_2:CO=1:3$ to 3:1. It can be ensured by the inventive method or by the inventive facility that the $H_2:CO$ ratio remains constant or in the desired/tolerable range over a period of operation.

Nickel or iron on the other hand would disrupt the process and should therefore be avoided absolutely, since even small amounts on the cathode would lead to a formation of hydrogen. If Ni or Fe is returned to the cathode, a disproportionate amount of $H_2$ can thus be formed and the synthetic gas ratio can be hard to adjust.

Furthermore hydrogen formed in principle could react according to the equation given below with CO present to form methane, which would only be able to be separated from CO at very great expense.

$$3\ H_2 + CO \rightarrow CG_4 + H_2O$$

Under this aspect too a formation of hydrogen is thus to be avoided in the present concept, so that in the ideal case the gas mixture, which merely contains CO and $CO_2$, is conveyed from the electrolyzer into the separation device.

Furthermore the formation of $H_2$ instead of the desired CO reduces the Faraday efficiency of the process, through which the power consumption, with the production rate of CO remaining the same, would increase significantly.

The above forms of forms of execution, embodiments and developments are able, where sensible, to be combined in any given way. Further possible embodiments, developments and implementations of the invention also include combinations not explicitly stated of previously or subsequently described features of the invention in relation to the exemplary embodiments. In particular the person skilled in the art will also add individual aspects as improvements or supplements to the respective basic form of the present invention.

The invention will be explained further in detail below in relation to various examples thereof. The invention is not however restricted to these examples.

Figure 3:
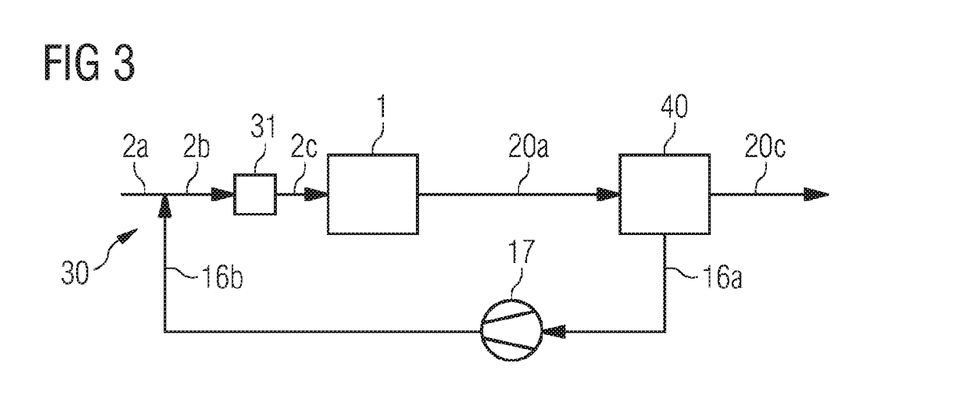
FIGS. 3 and 4 show schematic forms of embodiment of an inventive facility.

Example 1: Shown schematically in FIG. 3 is an inventive facility 30 with separation device 40 and return 16a, 16b, on the basis of which the basic concept of the invention for a CO electrolyzer operated under pressure can be illustrated. The structure in this case largely corresponds to that shown in FIG. 2. A principle advantage of a pressure electrolysis is that $CO_2$, which is as a rule supplied and stored under pressure, is not subject to any further decompression and recompression cycle. The result is an overall higher energy efficiency. Essentially pure product 20c is separated off in its turn in the separation device 40.

The significant difference from the prior art is that a cleaning unit 31, for example in the form of a separation facility, is provided, which removes carbonyls and oils from the gas flow. In this example the cleaning unit 31 is designed as a guard bed with adsorbing substance, for example active carbon or a zeolite or a mixture of different solid substances. The cleaning unit 31 in this example is expediently placed directly before the electrolysis device 1, since this represents the most sensitive point in relation to carbonyls and oils.

Through this the combined feed is divided into a section 2b before the cleaning unit 31 and a section 2c after the cleaning unit 31. The combined feed device 2c after the cleaning unit 31 here is advantageously made of a material or coated on the inside with a material that cannot form any carbonyls, for example plastic.

As an alternative however it can also be sensible for the cleaning unit 31 to be placed before the separation device 40, for example if said device is particularly sensitive to carbonyls and oils. Basically it is a feature of the invention that the facility 31 is placed within the circuit consisting of electrolysis device 1, separation device 40 and compressor 17.

Advantageously a gas mixture that essentially contains CO and $CO_2$ comes out of the electrolyzer, when a silver GDE is used for example. In the pressure electrolysis variant this gas flow is under pressure, which is helpful in the subsequent gas separation, since in this case higher propulsive forces are available for a separation. As a rule a separated gas leaves a separation device at a lower pressure, accordingly the flow of gas in the return device 16a before the compressor, which contains CO and $CO_2$, is at a lower pressure, for example at approximately ambient pressure, e.g. essentially at normal pressure. In order to make a return possible in this example this flow of gas is compressed with the compressor 17. The returned flow of gas is then combined with the educt $CO_2$ from the first feed device 2a and conveyed into the cleaning unit 31. The increased pressure likewise helps at this point in the inventive removal of undesired oils and carbonyls. The fact that cleaning unit 31 is placed shortly before the electrolysis 1, enables both the $CO_2$ of the first feed device 2a and also of the combined feed device 2b to contain oil and carbonyls, for example from the educt and/or the returned gas mixture. These will be removed in the cleaning device, so that these do not adversely affect the electrolysis in the electrolysis device 1.

Figure 4:
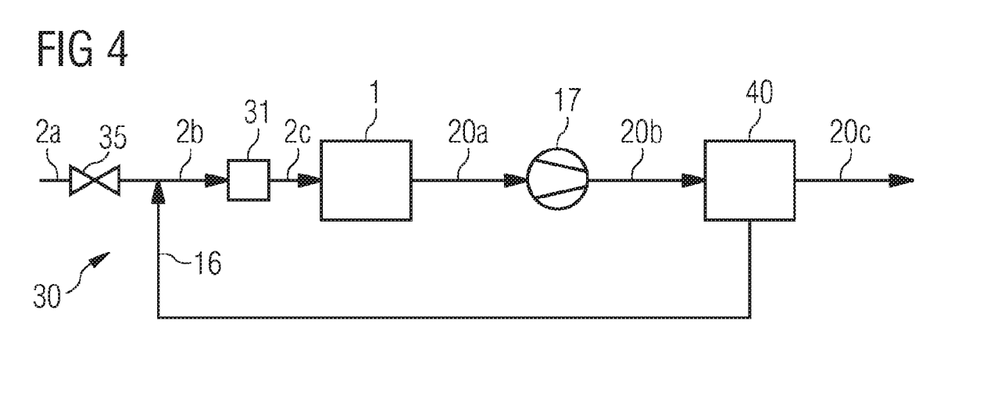

Example 2: As an alternative to the pressure electrolysis in example 1 a low-pressure electrolysis can be provided. This concept of an inventive facility is shown in FIG. 4. The structure is similar here to that shown in FIG. 3 in example 1.

In low-pressure electrolysis the electrolysis executes at pressures in the ambient pressure range. A disadvantage of this variant is that $CO_2$ present under pressure is first decompressed by the choke 35. This advantageously requires product gas formed in the electrolysis device 1 to be compressed again after the electrolysis before it is conveyed into the separation device 40, in order to achieve a good separation. Accordingly the compressor 17 is provided in the first discharge device 20a, b, with a section 20a before the compressor and a section 20b after the compressor. As a consequence there is likely to be a greater need for compression.

The advantage of atmospheric electrolysis is that the electrolysis device 1 can be a more simple design, since a few valves, for example for pressure regulation, can be omitted. Furthermore there can also be recourse to plastics that do not tend to form carbonyls in the choice of materials of the pipelines for the return device 16. A further advantage is that any contaminations that are caused by the compressor 17, first arrive in the separation device 40. Frequently a robust technology is employed within the separation device, which is thus tolerant in relation to carbonyls and oils.

The invention claimed is:

1. A facility for electrochemical production of a product containing CO, comprising:

an electrolysis cell comprising an anode and a cathode;
a combined feed device, which is connected to the electrolysis cell and supplies the electrolysis cell with a combined flow of material comprising a first educt flow and a flow of material to be returned comprising CO, which is embodied to supply the electrolysis cell with the combined flow of material comprising the first educt flow and the flow of material to be returned comprising CO;
a first feed device, which is connected to the combined feed device and feeds the first educt flow to the combined feed device, which is embodied to feed the first educt flow to the combined feed device;
a first discharge device, which is connected to the electrolysis cell and discharges from the electrolysis cell a first product flow comprising CO, which is embodied to discharge from the electrolysis cell the first product flow comprising CO and to feed the first product flow to a separation device;
the separation device, which is connected to the first discharge device and separates the flow of material comprising CO to be returned from the first product flow comprising CO, which is embodied to separate the flow of material comprising CO to be returned from the first product flow comprising CO;
a return device, which is connected to the separation device and is connected to the combined feed device and feeds the flow of material comprising CO to be returned to the combined feed device, which is embodied to feed the flow of material comprising CO to be returned to the combined feed device; and
at least one cleaning device, which removes carbonyls and/or oils from the first product flow comprising CO, the flow of material comprising CO to be returned and/or the combined flow of material comprising the first educt flow and the flow of material comprising CO to be returned and which is embodied to remove carbonyls and/or oils from the first product flow comprising CO, the flow of material comprising CO to be returned and/or the combined flow of material comprising the first educt flow and the flow of material comprising CO to be returned and which is arranged accordingly in the first discharge device, in the return device and/or in the combined feed device;
wherein the at least one cleaning device comprises a heating device to break down carbonyls and/or oils, wherein a moistener is connected in the direction of flow after the at least one cleaning device, in which water is fed to the first product flow comprising CO, to the flow material to be returned comprising CO and/or to the combined flow of material comprising the first educt flow and the flow material to be returned comprising CO and which is embodied to feed water to the first product flow comprising CO, to the flow of material to be returned comprising CO and/or to the combined flow of material comprising the first educt flow and the flow of material to be returned comprising CO.

2. The facility as claimed in claim 1, further comprising:
at least one compressor, which is arranged in the direction of flow in the first product flow comprising CO, in the flow of material to be returned comprising CO and/or in the combined flow of material comprising the first educt flow and the flow of material to be returned comprising CO before the at least one cleaning device in the first discharge device, in the return device and/or in the combined feed device.

3. The facility as claimed in claim 2,
wherein the at least one compressor is embodied in such a way that the first product flow comprising CO, the flow of material to be returned comprising CO and/or the combined flow of material comprising the first educt flow and the flow of material to be returned comprising CO does not come into contact with oil used in the compressor.

4. The facility as claimed in claim 1,
wherein the first discharge device, the return device and/or in the combined feed device in the direction of flow behind the at least one cleaning device, at least in parts that come into contact with the first product flow comprising CO, the flow of material to be returned comprising CO and/or the combined flow of material comprising the first educt flow and the flow of material to be returned comprising CO consists of a material or is coated with a material that is selected from iron and nickel-free metallic materials, plastic, steels containing Cr and/or mixtures thereof.

5. The facility as claimed in claim 1,
wherein the separation device comprises a separation membrane, an adsorbent, an absorbent, a condenser, a distillation unit and/or a second heating device.

6. The facility as claimed in claim 1,
wherein the first discharge device, the separation device, the return device, the at least one cleaning device and/or in the combined feed device and/or if necessary at least one compressor, at least in parts that come into contact with the first product flow comprising CO, the flow of material to be returned comprising CO and/or the combined flow of material comprising the first educt flow and the flow of material to be returned comprising CO consists of a material or is coated with a material that is selected from iron and nickel-free metallic materials, plastic, steels containing Cr and/or mixtures thereof.

7. The facility as claimed in claim 1, further comprising:
a deoxo unit, which is located in the first discharge device and which is embodied to remove oxygen from the first product flow comprising CO.

8. A method for electrochemical production of a product containing CO using the facility as claimed in claim 1, comprising:
introducing the first educt flow into the first feed device of the facility;
feeding the first educt flow to the electrolysis cell;
converting the first educt flow to a first product flow comprising CO;
discharging the first product flow comprising CO from the electrolysis cell;
separating a flow of material to be returned comprising CO from the product flow comprising CO in the separation device; and
returning the flow of material to be returned comprising CO to the combined feed device, and
removing, with the at least one cleaning device, the carbonyls and/or oils from the first product flow comprising CO, the flow of material to be returned comprising CO and/or the combined flow of material comprising the first educt flow and the flow of material to be returned comprising CO.

9. The method as claimed in claim 8,
wherein the first educt flow is a gas flow that comprises $CO_2$.

10. The method as claimed in claim 8,
wherein the first educt flow is a gas flow that is introduced into the first feed device under increased pressure, wherein preferably the at least one cleaning device is provided in the combined feed device.

11. The method as claimed in claim 8,
wherein the first educt flow is a gas flow that is introduced into the first feed device at ambient pressure, wherein the first product flow comprising CO is compressed.

12. The method as claimed in claim 11,
wherein the at least one cleaning device is arranged after a compressor for compressing the first product flow comprising CO and before the separation device.

13. The method as claimed in claim 8,
wherein a second product flow comprising hydrogen and where necessary CO is furthermore separated in the separation device from the first product flow comprising CO.

* * * * *